(12) United States Patent
Woditschka

(10) Patent No.: US 7,233,436 B2
(45) Date of Patent: Jun. 19, 2007

(54) SLIDER FOR POSITIONING MULTIPLE OPTICAL ELEMENTS, AND MICROSCOPE HAVING A SLIDER FOR POSITIONING MULTIPLE OPTICAL ELEMENTS

(75) Inventor: Christian Woditschka, Wetzlar (DE)

(73) Assignee: Leica Microsystems CMS GmbH (DE)

( * ) Notice: Subject to any disclaimer, the term of this patent is extended or adjusted under 35 U.S.C. 154(b) by 198 days.

(21) Appl. No.: 11/171,556

(22) Filed: Jun. 30, 2005

(65) Prior Publication Data

US 2006/0011456 A1    Jan. 19, 2006

(30) Foreign Application Priority Data

Jul. 19, 2004    (DE) .................... 10 2004 034 844

(51) Int. Cl.
*G02B 7/00* (2006.01)
*G02B 21/00* (2006.01)
(52) U.S. Cl. ...................................... 359/381; 359/821
(58) Field of Classification Search ............... 359/368, 359/381, 819, 821
See application file for complete search history.

(56) References Cited

U.S. PATENT DOCUMENTS

| 4,678,291 | A | | 7/1987 | Nyman et al. |
| 5,861,982 | A | * | 1/1999 | Takahama et al. .......... 359/381 |
| 6,088,155 | A | * | 7/2000 | Tandler et al. .............. 359/381 |
| 6,219,180 | B1 | * | 4/2001 | Hasegawa et al. .......... 359/387 |
| 6,479,807 | B1 | | 11/2002 | Toshimitsu |

* cited by examiner

*Primary Examiner*—Mark A. Robinson
(74) *Attorney, Agent, or Firm*—Houston Eliseeva LLP

(57) ABSTRACT

A slider for positioning multiple optical elements is disclosed. Also disclosed is a microscope that contains the slider (25) according to the present invention. The slider (25) encompasses a slider carrier (35) that is guided on a first shaft (31) and a second shaft (32). The second shaft (32) is equipped with multiple detent positions (34) so as thereby to position the slider (25) exactly in the optical axis (20) of the microscope (1). The slider carrier (35) is guided on the second shaft (32) by a first roller (36) and a second roller (38). The second roller (38) is arranged below the center axis of the second shaft (32).

18 Claims, 5 Drawing Sheets

SLIDER FOR POSITIONING MULTIPLE OPTICAL ELEMENTS, AND MICROSCOPE HAVING A SLIDER FOR POSITIONING MULTIPLE OPTICAL ELEMENTS

RELATED APPLICATIONS

This application claims priority of the German patent application 10 2004 034 844.8 which is incorporated by reference herein.

FIELD OF THE INVENTION

The invention concerns a slider for positioning multiple optical elements. The invention concerns in particular a slider for positioning multiple optical elements, a slider body carrying the optical elements, and a first shaft being guided in the slider body. The invention further concerns a microscope having a slider for positioning multiple optical elements. The invention concerns in particular a microscope having a slider for positioning multiple optical elements in an optical axis defined by the microscope. A slider body carries the optical elements, and a first shaft is guided in the slider body. The microscope encompasses a stand and a tube connectable to the stand. The slider body is displaceable from outside the stand.

BACKGROUND OF THE INVENTION

U.S. Pat. No. 6,479,807 discloses a microscope allowing rapid switchover between different observation methods. Provided for this purpose is a slider on which multiple optical elements are arranged. The slider is slid completely into the microscope. A corresponding opening for receiving the slider is embodied on the microscope for this purpose. V-shaped snap-lock grooves embodied on the slider permit positioning of the optical elements in the optical axis of the microscope. Because the slider comes into contact over its entire surface with the opening embodied in the microscope for receiving the slider, low-friction guidance of the slider is definitely not present. Operation of the slider from outside the microscope is also not possible, since the position of the entire slider itself must be modified by a user, and no actuation element is present with which the user can modify the position of the slider.

U.S. Pat. No. 4,678,291 discloses an apparatus for microscopes that permits rapid switching between different observation methods. Although the optical elements are actuatable from outside the microscope, displacement of the optical elements nevertheless occurs by way of a threaded spindle, and the optical element itself is guided on a dovetail.

SUMMARY OF THE INVENTION

It is the object of the invention to make available a slider, guided in low-friction fashion, for positioning multiple optical elements, which slider makes possible accurate positioning of the optical elements and permits alignment.

The aforesaid object is achieved by way of a slider for positioning multiple optical elements, comprising: a slider body carrying the optical elements, a first shaft guided in the slider body, a second shaft provided for guiding the slider wherein the second shaft is equipped with detent positions; the slider is guided on the second shaft with a first roller resting on the second shaft and a second roller is in rolling contact below the center axis of the second shaft wherein the second roller coacts with the detent positions.

A further object of the invention is to create a microscope having a slider for positioning multiple optical elements, the slider being guided in low-friction fashion and operable from outside the microscope, and permitting an alignment capability.

The aforesaid object is achieved by way of a microscope comprising: a slider for positioning multiple optical elements in an optical axis defined by the microscope, a slider body which carries the optical elements, a first shaft guided in the slider body, the microscope encompassing a stand and a tube connectable to the stand, and the slider body being displaceable from outside the stand, a second shaft provided for guiding the slider, wherein the second shaft is equipped with detent notches; the slider is guided on the second shaft with a first roller resting on the second shaft; and a second roller is in rolling contact below the center axis of the second shaft and coacts with the detent notches.

The invention has the advantage that in addition to the first shaft guided in the slider body, a second shaft for guiding the slider is provided. The second shaft is equipped with detent notches. The slider is guided on the second shaft with a first roller resting on the second shaft. A second roller is in rolling contact below the center axis of the second shaft, and coacts with the detent notches.

It is also advantageous to make available a microscope having a slider for positioning multiple optical elements in an optical axis defined by the microscope. A slider body carries the optical elements, and a first shaft is guided in the slider body. The microscope encompasses a stand and a tube connectable to the stand. The slider body is displaceable from outside the stand. A second shaft is provided for guiding the slider, the second shaft being equipped with detent notches. The slider is guided on the second shaft with a first roller resting on the second shaft, and a second roller is in rolling contact below the center axis of the second shaft and coacts with the detent notches.

The first roller is an alignment roller with which an adjustment of the slider body in the Z direction is accomplished. The alignment roller is mounted on a lever whose position is adjustable by advancing a set screw, thus adjusting the slider body in the Z direction.

Each of the detent notches provided on the second shaft defines a detent position that determines the accurately defined location of the slider body. Linear, precise engagement at the detent notches is accomplished via a detent spring that is provided with the second roller. The second roller is arranged in such a way that as a result of the pressure of the detent spring, the slider is always impinged upon with a force that is directed in a direction below the second shaft. This ensures that the slider cannot jump down away from the second shaft. The detent spring is embodied as a leaf spring.

The first shaft of the slider is guided linearly and uniformly in the slider body in at least one bushing. At least one bushing is embodied as a sintered bushing. It is advantageous to provide two of these sintered bushings in the slider body. The optical elements arranged on the slider body are embodied as plane and/or spherical optical elements.

The slider is movable by means of a push/pull rod attached to the slider body, so that the plane and/or spherical optical elements are positionable in a beam path.

An adjustment mechanism is associated with the spherical optic arranged on the slider body, the spherical optic and the adjustment mechanism being arranged in the interior of the microscope stand, and the adjustment mechanism positioning the spherical optic in the X/Y plane with respect to the optical axis. In an advantageous embodiment, the spherical optic is a Bertrand lens. The plane optic arranged on the slider is at least one prism. The adjustment mechanism for the spherical optic encompasses an alignment screw that is actuatable through the opening in the stand by means of a tool.

The microscope can be configured as an inverted microscope.

DETAILED DESCRIPTION OF THE INVENTION

Figure 1:
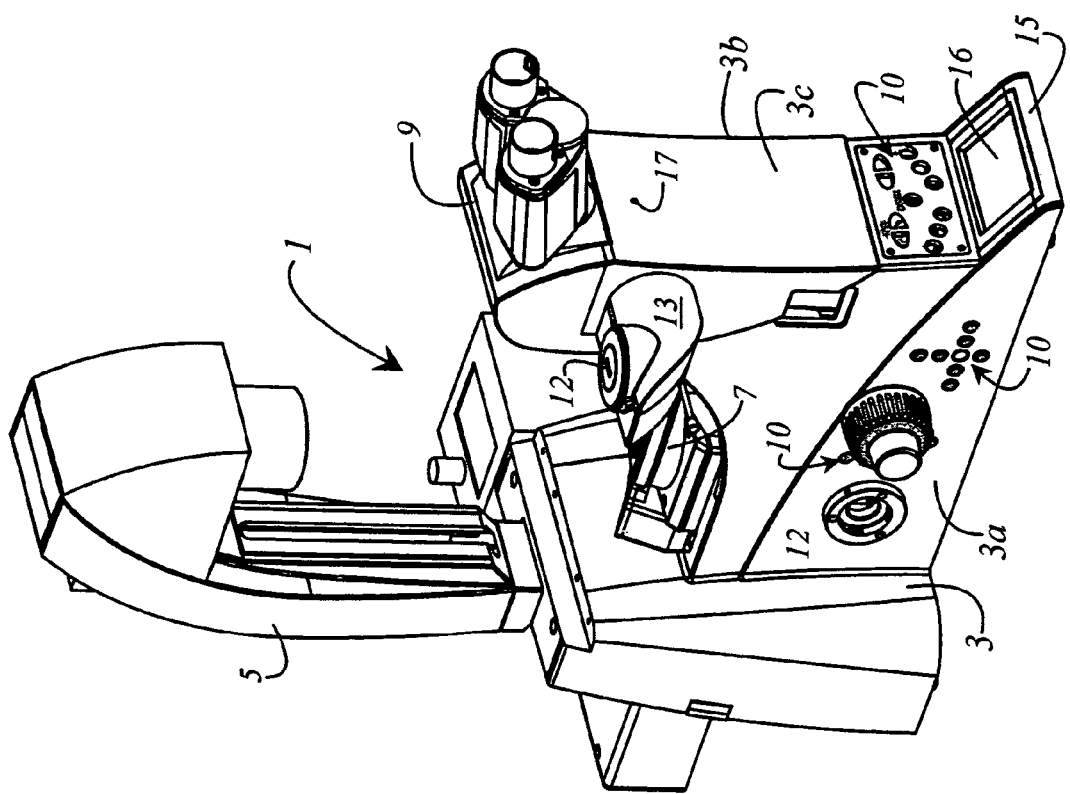
FIG. 1 is a perspective view of a microscope in which the invention is implemented.

FIG. 1 is a perspective view of microscope 1 in which the invention is implemented. In the embodiment depicted in FIG. 1, the microscope is an inverted microscope. This is, however, in absolutely no way to be construed as a limitation of the invention. It is self-evident to anyone skilled in the art that the present invention can be implemented in any microscope, so that it is immaterial whether an inverted or an upright microscope is involved. Microscope 1 comprises a base stand part 3 and an illumination stand part 5 placed on base stand part 3. Base stand part 3 encompasses a first lateral surface 3a, a second lateral surface 3b, and a front surface 3c facing toward the user. Base stand part 3 of the microscope carries a revolving nosepiece 7 with which different objectives (not depicted) can be introduced into the beam path of the microscope. Microscope 1 is also equipped with a tube 9. Multiple operating knobs 10 are provided respectively on first lateral surface 3a, on second lateral surface 3b, and on front surface 3c. A user can actuate motorized microscope functions by way of operating knobs 10. Microscope 1 also encompasses multiple ports 12 through which the beam path of microscope 1 can be coupled out. A camera or another measuring device, for example, can be placed onto ports 12. Tube 9 encompasses a lateral outlet 13 that carries one of ports 12. Base stand part 3 possesses a wedge-shaped extension 15 on front surface 3c of the microscope. Wedge-shaped extension 15 carries a display 16 that is tilted at an angle of less than 45° from the horizontal. Embodied in front surface 3c of the microscope is an opening 17 through which the user can adjust or align optical elements in the interior of base stand part 3 of microscope. The user utilizes a tool (not depicted) for alignment.

Figure 2:
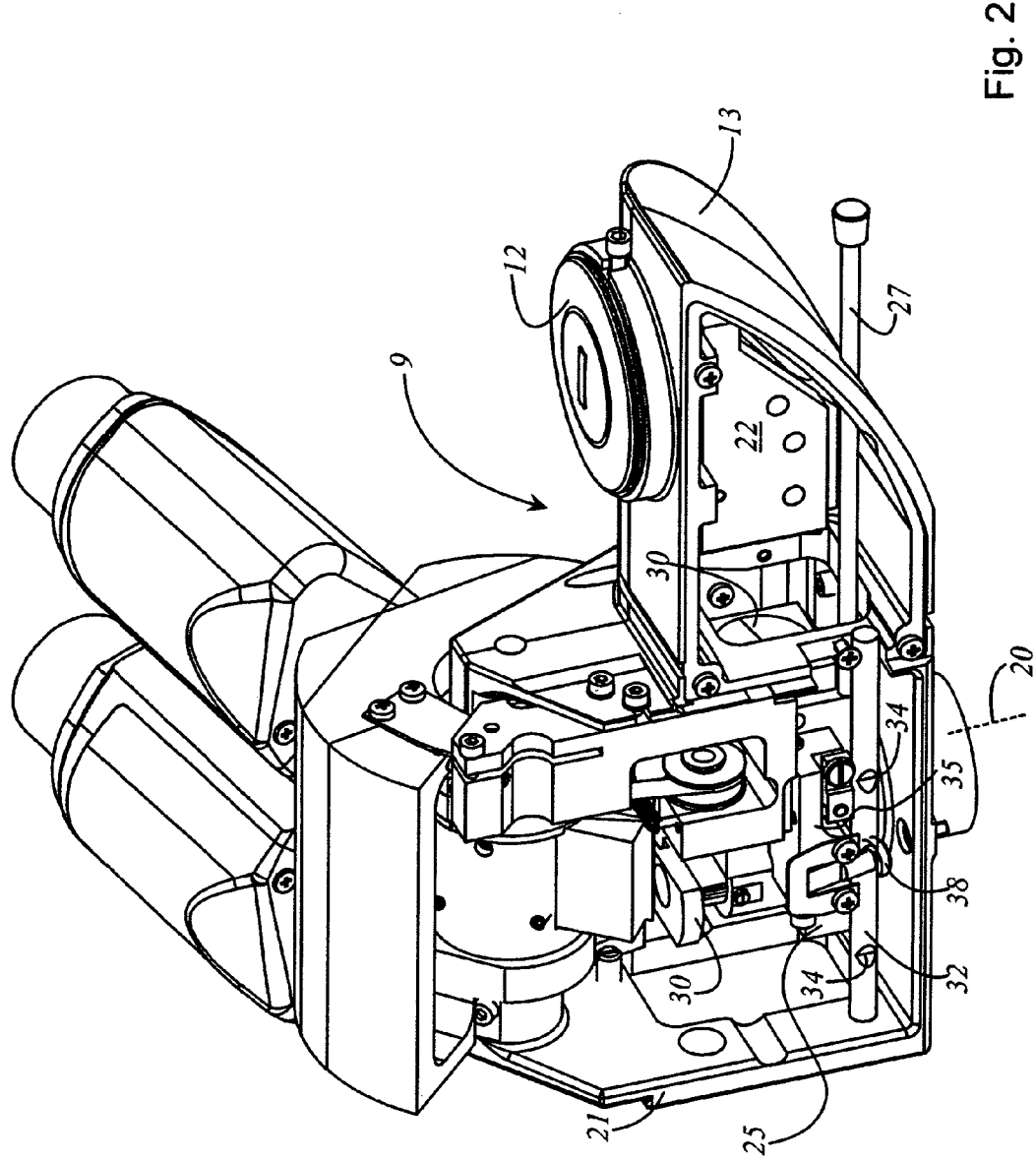
FIG. 2 is a perspective view of a microscope tube in the interior of which the slider according to the present invention is installed.

FIG. 2 shows tube 9 for the microscope in which the present invention is implemented. As already mentioned in the description of FIG. 1, tube 9 possesses a lateral outlet 13 that carries a port 12. Optical axis 20 of the microscope extends through tube 9. Tube 9 and lateral outlet 13 are surrounded by a wall 21. Arranged in the interior of lateral outlet 13 is a prism 22 that deflects optical axis 20 of the microscope to port 12 mounted on lateral outlet 13. A slider 25 is arranged in the interior of tube 9. Slider 25 is connected to a push/pull rod 27 that passes through wall 21 of tube 9. Slider 25 can be displaced linearly within tube 9 using push/pull rod 27. Slider 25 carries multiple optical elements 30. Slider 25 is linearly guided by means of a first shaft 31 (see FIG. 3) and a second shaft 32. Second shaft 32 is embodied with multiple detent positions 34. Detent positions 34 are constituted by notches in second shaft 32. Slider 25 is guided on second shaft 32 with a roller 36 resting on second shaft 32 (see FIG. 3). A second roller 38 is arranged below the center axis of second shaft 32. Second roller 38 is in rolling contact on second shaft 32 and coacts with detent positions 34. First roller 36 is embodied as an alignment roller, with which an adjustment of slider body 35 (see FIG. 3) in the Z direction is accomplished.

Figure 3:
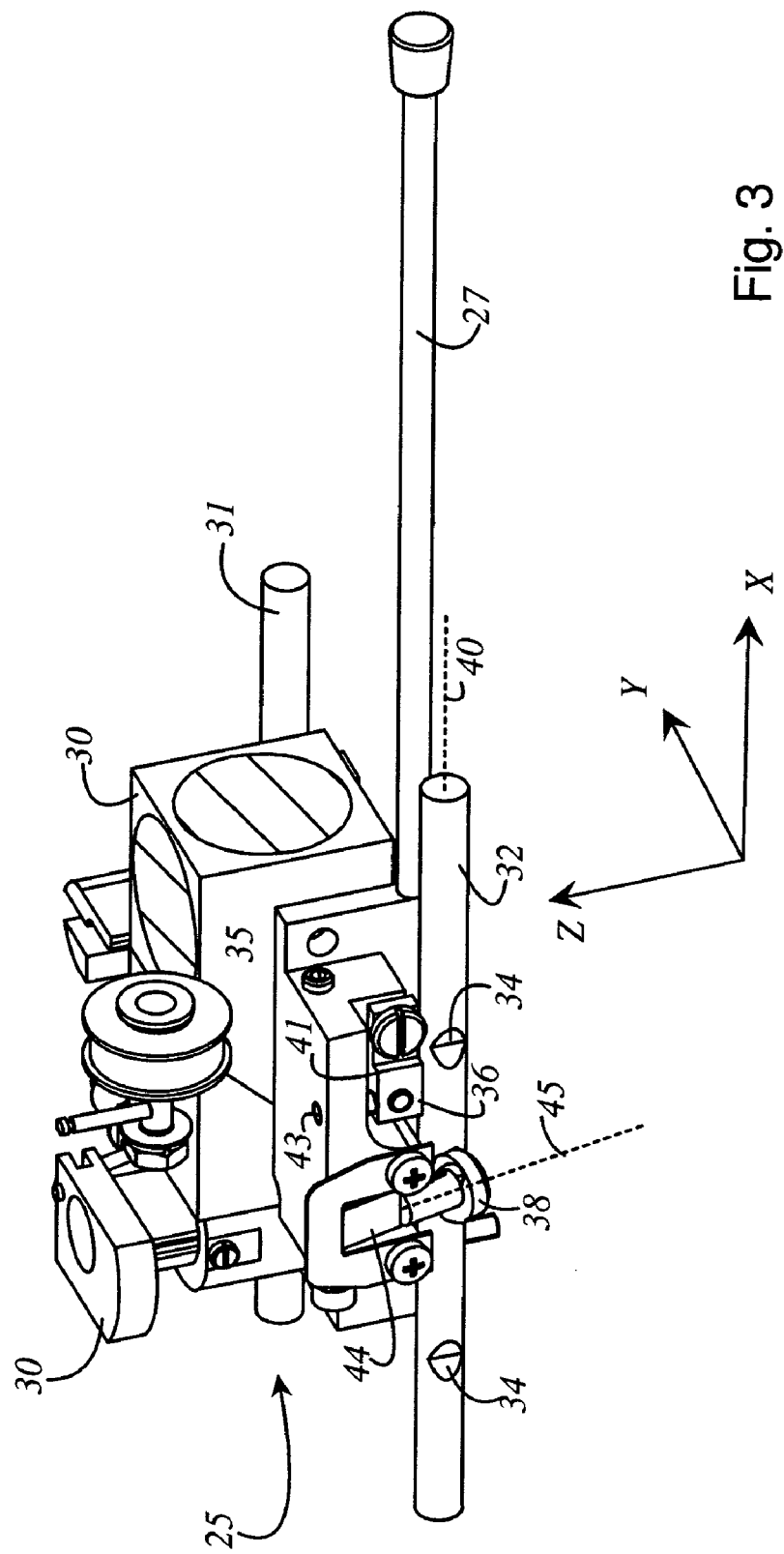
FIG. 3 is a perspective view of the slider and of the elements connected to the slider for actuation and guidance.

FIG. 3 is a perspective depiction of slider 25. Slider body 35 of slider 25 is guided by a first shaft 31 and a second shaft 32. A push/pull rod 27 is attached to slider body 35 of slider 25. As already mentioned, by means of the push/pull rod a user can move slider 25 and slider body 35 linearly in the direction defined by first shaft 31 and second shaft 32. Slider body 35 carries multiple optical elements 30. One optical element 30 is embodied as a spherical optic, another optical element 30 is embodied as a plane optic. First shaft 31 is guided in slider body 35 (see FIG. 5). Slider body 35 is guided on second shaft 32 by a first roller 36 and a second roller 38. First roller 36 rests on the second shaft. Second roller 38 is arranged on the slider body is such a way that it is in rolling contact on second shaft 32 below center axis 40 of second shaft 32. Embodied on second shaft 32 are multiple detent positions 34, with which second roller 38 coacts in order thereby to position slider 25. First roller 36 is embodied as an alignment roller and is mounted on a lever 41. Provided in slider body 35 is a set screw 43 which, when advanced, allows modification of the position of slider body 35 in the Z direction. Second shaft 32 is equipped with a plurality of detent positions 34 that are embodied as detent notches, with which second roller 38 coacts. Precise engagement into detent positions 34 is accomplished via a detent spring 44 that presses the second roller into the detent notch of detent position 34. Linear, precise engagement of slider 25 and slider body 35 is thereby achieved. Detent spring 44 is embodied as a leaf spring. Axis 45 of second roller 38 is inclined with respect to the Z direction. As already mentioned, this ensures secure retention and guidance of slider 25 on first shaft 31 and second shaft 32.

Figure 4:
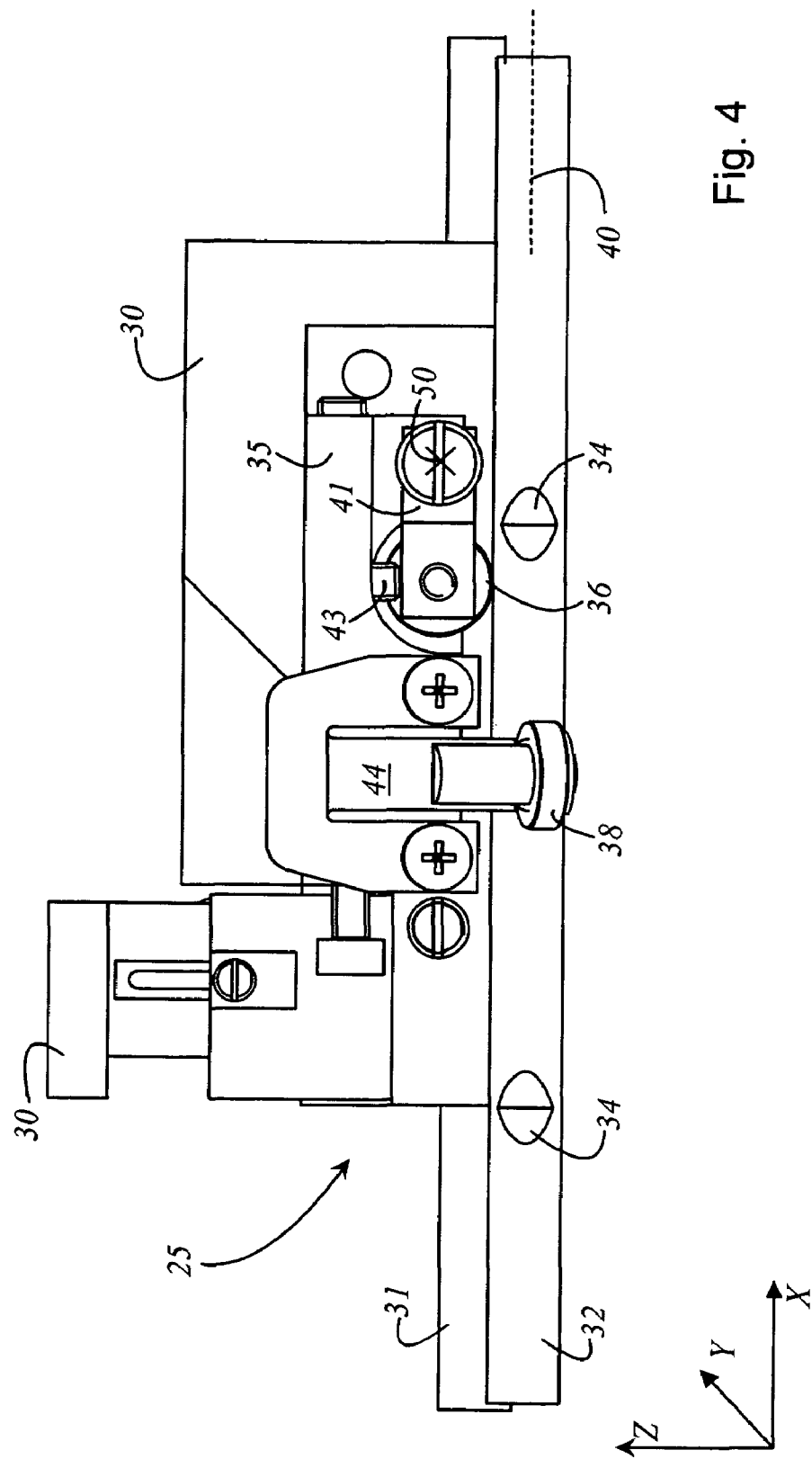
FIG. 4 is a side view of the slider.

FIG. 4 is a side view of slider 25, first shaft 31 being arranged higher up (in the Z direction) than second shaft 32. Slider body 35 carries optical elements 30. As already mentioned, one of optical elements 30 is embodied as a spherical optical element. Other optical elements 30 can be embodied as plane optical elements. One example of a plane optic that may be cited is, e.g., a prism. The spherical optic depicted in FIG. 4 is embodied adjustably in the Z direction. According to an embodiment of the invention, the spherical optic can be a Bertrand lens. Slider body 35 is guided on second shaft 32 by a first roller 36 and a second roller 38. Second roller 36 is embodied adjustably in the Z direction. For that purpose, the first roller is mounted on a lever 41 that is supported pivotably about an axis 50. The position of lever 41, and thus also the position of first roller 36, in the Z direction can be set by way of a set screw 43. Second roller 38 is in rolling contact on second shaft 32 slightly below center axis 40 of second shaft 32. As already repeatedly mentioned, more secure seating of slider body 35 in the linear guidance system is thereby ensured. The second roller is mounted on a leaf spring 44 and thus presses onto second shaft 32.

Figure 5:
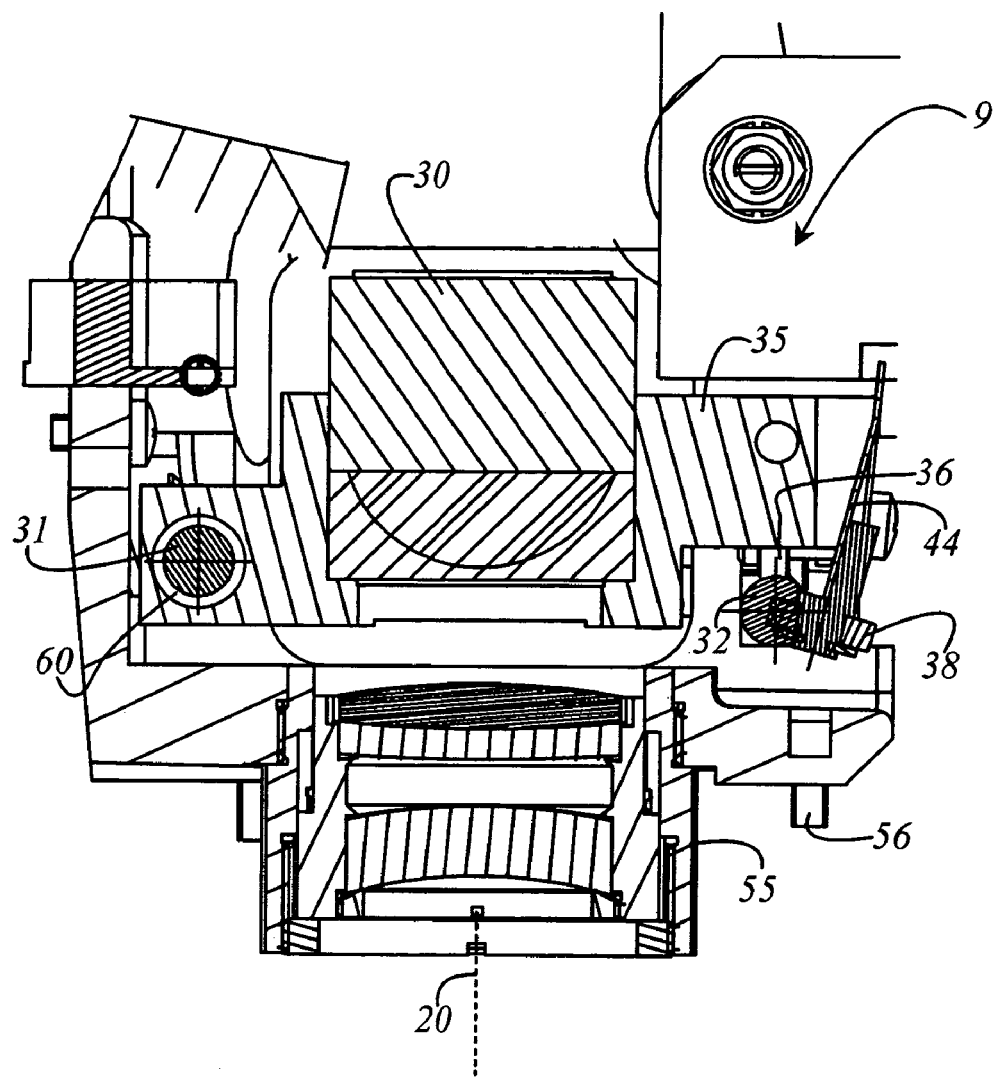
FIG. 5 is a section through the microscope tube in which the present invention is installed.

FIG. 5 is an enlarged depiction of slider 25 installed in the tube of a microscope. Tube 9 encompasses an incoupling optic that is arranged in a tubular member 55. The tube also carries at least one pin 56 that corresponds to an analogous recess on stand 3 of the microscope. Tubular member 55 and the at least one pin 56 ensure immovable and secure mounting of tube 9 on stand 3 of microscope 1. First shaft 31 is guided in slider body 35. First shaft 31 is supported by at least one bushing 60. It is particularly advantageous in this context to provide at least two bushings along first shaft 31. The at least one bushing 60 is embodied as a sintered bushing. Slider body 35 carries at least one optical element 30. Second shaft 32 is arranged outside slider body 35, slider body 35 being guided on second shaft 32 with a first roller 36 and a second roller 38. As already mentioned, the first roller rests on the second shaft. Second roller 38 makes contact below the center axis of second shaft 32. The second roller or the retainer of second roller 38 is impinged upon by a leaf spring 44, so that second roller 38 is pressed against second shaft 32. First shaft 31 and second shaft 32 are arranged parallel to one another, first shaft 31 being located higher up than second shaft 32.

The invention has been described with reference to a particular embodiment. It is self-evident, however, that changes and modifications can be made without thereby leaving the range of protection of the claims below.

What is claimed is:

1. A slider for positioning multiple optical elements, comprising: a slider body carrying the optical elements, a first shaft guided in the slider body, a second shaft provided for guiding the slider wherein the second shaft is equipped with detent positions; the slider is guided on the second shaft with a first roller resting on the second shaft and a second roller is in rolling contact below the center axis of the second shaft wherein the second roller coacts with the detent positions.

2. The slider as defined in claim 1, wherein the first roller is an alignment roller, wherein the alignment roller is mounted on a lever whose position is adjustable by advancing a set screw, the slider body thus being adjustable in the Z direction.

3. The slider as defined in claim 1, wherein each of the detent positions is embodied as a detent notch, and linear, precise engagement at the detent notches is accomplished via a detent spring that is provided with the second roller, the second roller being arranged in such a way that as a result of the pressure of the detent spring, the slider is always impinged upon with a force that is directed in a direction below the second shaft, so that the slider does not jump down away from the second shaft.

4. The slider as defined in claim 1, wherein the first shaft of the slider is guided linearly and uniformly in the slider body in at least one bushing.

5. The slider as defined in claim 1, wherein the optical elements (30) are embodied as plane and/or spherical optical elements.

6. The slider as defined in claim 5, wherein the slider is movable by means of a push/pull rod attached to the slider body; and the plane or spherical optical elements are positionable in a beam path.

7. A microscope comprising: a slider for positioning multiple optical elements in an optical axis defined by the microscope, a slider body which carries the optical elements, a first shaft guided in the slider body, the microscope encompassing a stand and a tube connectable to the stand, and the slider body being displaceable from outside the stand, a second shaft provided for guiding the slider, wherein the second shaft is equipped with detent notches; the slider is guided on the second shaft with a first roller resting on the second shaft; and a second roller is in rolling contact below the center axis of the second shaft and coacts with the detent notches.

8. The microscope as defined in claim 7, wherein the first roller is an alignment roller with which an adjustment of the slider body in the Z direction is accomplished, wherein the alignment roller is mounted on a lever whose position is adjustable by advancing a set screw, the slider body thus being adjusted in the Z direction.

9. The microscope as defined in claim 7, wherein each of the detent notches on the second shaft defines a detent position that determines the accurately defined location of the slider body, wherein linear, precise engagement at the detent notches is accomplished via a detent spring that is provided with the second roller, the second roller being arranged in such a way that as a result of the pressure of the detent spring, the slider is always impinged upon with a force that is directed in a direction below the second shaft, so that the slider does not jump down away from the second shaft.

10. The microscope as defined in claim 9, wherein the detent spring is a leaf spring.

11. The microscope as defined in claim 7, wherein the first shaft of the slider is guided linearly and uniformly in the slider body in at least one bushing.

12. The microscope as defined in claim 7, wherein the optical elements are embodied as plane and/or spherical optical elements.

13. The microscope as defined in claim 12, wherein the slider is movable by means of a push/pull rod attached to the slider body; and the plane or spherical optical elements are positionable in a beam path.

14. The microscope as defined in claim 12, wherein an adjustment mechanism is associated with the spherical optic on the slider; the spherical optic and the adjustment mechanism are arranged in the interior of the stand; and the adjustment mechanism positions the spherical optic in the X/Y plane with respect to the optical axis.

15. The microscope as defined in claim 14, wherein the spherical optic is a Bertrand lens.

16. The microscope as defined in claim 12, wherein the plane optic is at least one prism arranged on a slider.

17. The microscope as defined in claim 16, wherein the tube of the microscope comprises a lateral port; and the prism arranged on the slider, by displacement of the slider, deflects the optical axis of the microscope to the port.

18. The microscope as defined in claim 7 wherein the microscope is an inverted microscope.

* * * * *